Figure 3:
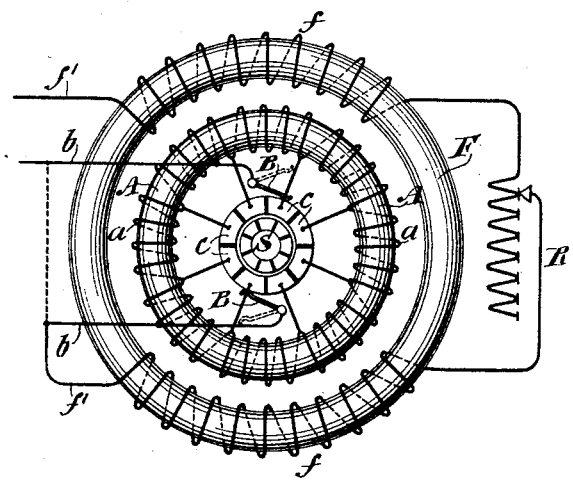

(No Model.)  3 Sheets—Sheet 1.
E. ARNOLD.
ALTERNATING CURRENT MOTOR.
No. 562,365.  Patented June 23, 1896.
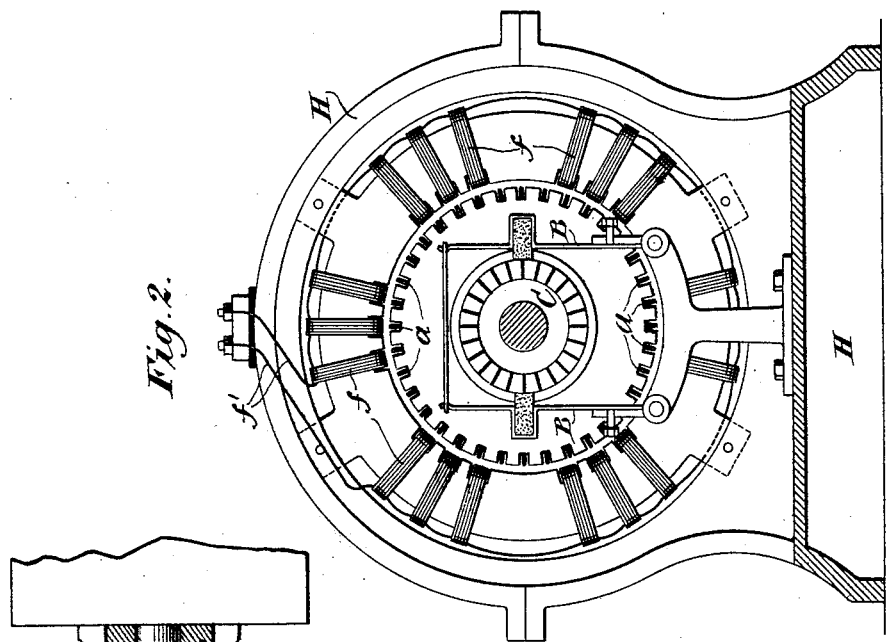
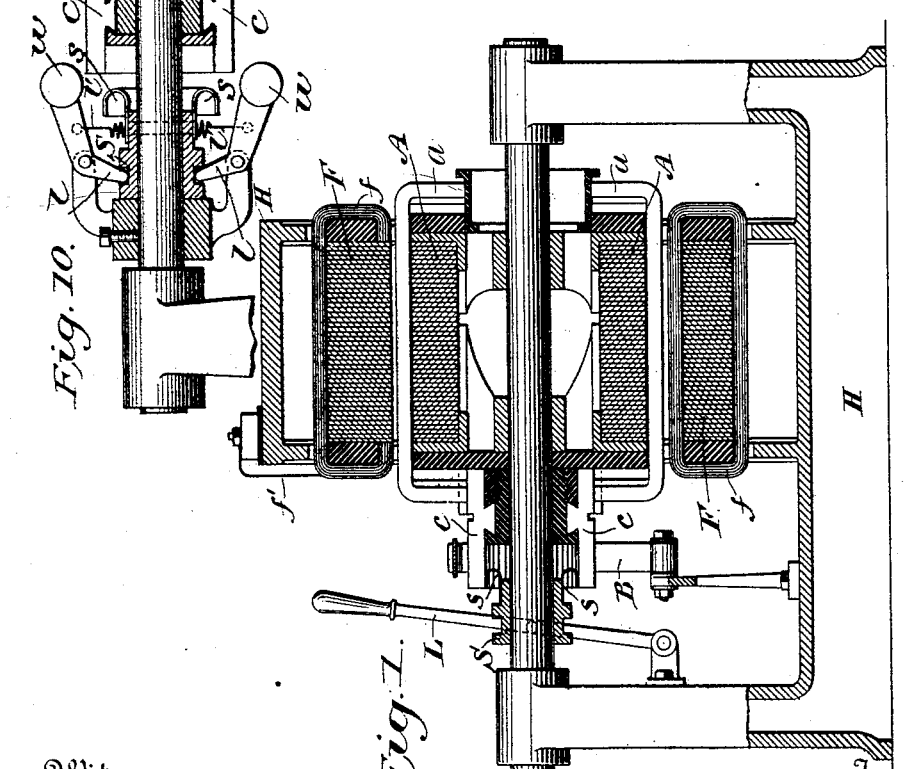
Witnesses
Edward Thorpe
Geo. H. Sonneborn
Inventor
Engelbert Arnold
By his Attorney (No Model.) 3 Sheets—Sheet 2.
E. ARNOLD.
ALTERNATING CURRENT MOTOR.

No. 562,365. Patented June 23, 1896.

Witnesses
Edward Thorpe
Geo. H. Sonneborn

Inventor
Engelbert Arnold
By his Attorney
Harold Binney (No Model.)  3 Sheets—Sheet 3.

E. ARNOLD.
ALTERNATING CURRENT MOTOR.

No. 562,365. Patented June 23, 1896.

Witnesses
Edward Thorpe
Geo. H. Sonneborn

Inventor
Engelbert Arnold
By his Attorney

UNITED STATES PATENT OFFICE.

ENGELBERT ARNOLD, OF ZURICH, SWITZERLAND.

ALTERNATING-CURRENT MOTOR.

SPECIFICATION forming part of Letters Patent No. 562,365, dated June 23, 1896.

Original application filed January 11, 1893, Serial No. 458,064. Divided and this application filed July 10, 1894. Serial No. 517,092. (No model.) Patented in England December 17, 1892, No. 23,290; in Switzerland December 24, 1892, No. 6,306, and in Germany January 1, 1893, No. 74,684.

*To all whom it may concern:*

Be it known that I, ENGELBERT ARNOLD, a citizen of Switzerland, residing at Zurich, Switzerland, have invented certain new and useful Improvements in Alternating-Current Motors for Single or Poly Phase Electric Currents, (for which I have obtained patents in Switzerland, No. 6,306, dated December 24, 1892; in Germany, No. 74,684, dated January 1, 1893, and in Great Britain, No. 23,290, dated December 17, 1892,) of which the following is a description, referring to the accompanying drawings, which form a part of this specification.

The subject-matter of this specification is part of that included in my earlier application, Serial No. 458,064, filed January 11, 1893, and the present application is a division thereof, which has been filed at the request of the Patent Office to set forth the invention more fully and in detail.

Alternate-current motors may be divided into two classes: those capable of self-starting, and those which have to be initially started in order to operate under the influence of an alternating current. The first class includes, as a rule, motors operated by two or more currents of differing phases, which, in their operation, produce a rotating magnetic field. The second class includes single-phase motors incapable of self-starting because no rotation of the magnetic field will occur until the magnetic reversals are converted into a rotary magnetic effect, as by the influence of an armature revolving synchronously with the alternations or reversals of the current. Both these classes of motors, as at present constructed, usually require an excessive amount of electrical energy in starting, and are therefore wasteful, inefficient, and commercially unsatisfactory for railways and the many other uses in which it is desirable to frequently stop and start.

My present invention forms an improvement in the art of controlling and operating electric motors, and an improvement in the construction of such motors, whereby they may be readily and efficiently started with the necessary torque, and with a comparatively small consumption of energy.

The invention in its broader form is applicable alike to single-phase and multiphase currents, whether alternating, intermittent, pulsatory, or undulatory in character, and the term "alternating," as used throughout this specification, must be understood to include all forms of current capable of producing similar inductive effects.

When one or more alternating currents are supplied to the field-magnets of a motor to produce a rotating magnetic field, the armature, if revolving in such field synchronously with the current, is subject to a minimum inductive effect, and as load is put upon the machine the retardation of the armature causes an increase of the induced currents which supply the necessary torque to overcome the resistance of the load. When, however, the armature is stationary, and such currents are supplied to the field-magnet coils, the armature-coils, acting like the secondary coils of a converter, are subjected to an excessive induction, and, if short-circuited or closed upon themselves, to a corresponding flow of current needlessly heating the coils while producing comparatively small useful effect.

According to my invention I start the motor with the circuit so arranged that the initial torque is provided in the most economic and advantageous manner, and as speed is attained the armature-windings are short-circuited and the motor restored to its normal condition, the short-circuited armature rotating more or less synchronously with the alternations of the field-current. This result is obtained by initially connecting the motor in the same manner as though it were to be operated by constant current, that is to say, the armature-coils are supplied with current from an external source, and the current so commutated or introduced as to produce poles at an angle with the poles produced in the field-magnets. This is preferably done by connecting commutator-brushes in series with the field-magnet circuit. In this manner the excessive flow of current in the armature is prevented, and sufficient torque produced to allow the motor to acquire the necessary speed. When the critical speed has been acquired, the armature-coils may be short-circuited and the brushes raised from the commutator, care being, of course, taken to so connect the external circuit that the raising of the brushes shall not break the circuit.

In some forms of my invention I gradually increase the electromotive force supplying current to the field-coils while decreasing that supplying the armature-coils, until the armature-coils are finally short-circuited, and the motor runs as a short-circuited alternate-current motor.

Such briefly is an outline of my improved method of starting, controlling, and operating electromotors. The details of some of the preferred forms of apparatus by which it is carried into effect will be more readily understood in connection with the accompanying drawings, wherein—

Figure 8:
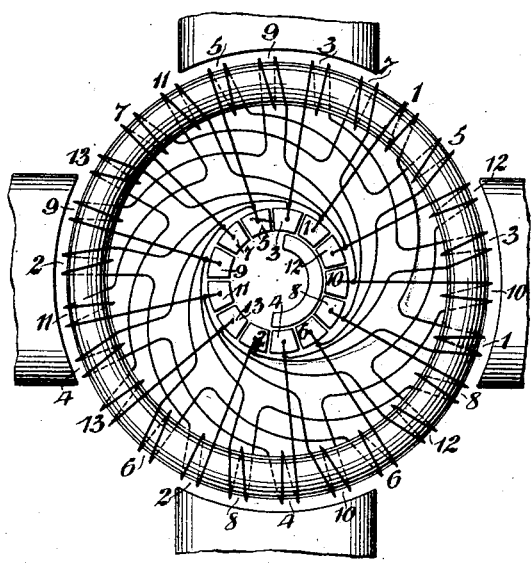
Figure 9:
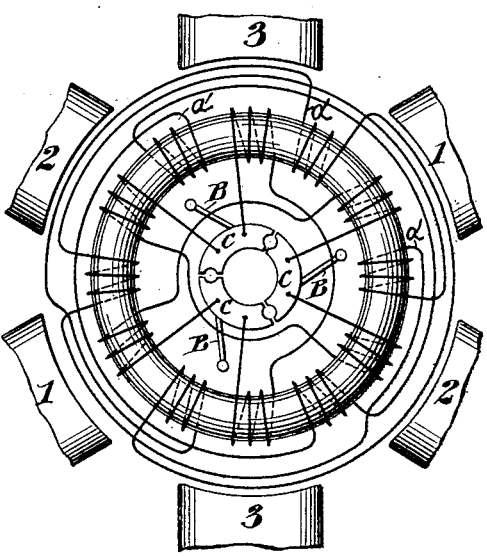

Figures 1 and 2 are an axial vertical section and an end view of a multipolar single-phase alternate-current motor embodying my invention. Figs. 3, 4, 5, 6, and 7 are diagrammatic illustrations of various modifications of my invention as embodied in a single-phase two-pole motor. Fig. 8 is a diagrammatic illustration of my invention as applied to a four-pole armature with coils connected in series. Fig. 9 is a view of a motor as constructed for three-phase currents, and Fig. 10 shows an automatic short-circuiting device for carrying out my method.

Throughout the drawings like letters and figures of reference indicate like parts.

I will describe the various forms and embodiments of my invention shown in the accompanying drawings, including in each such description an explanation of my method in its various modifications as applied to each.

Figs. 1 and 2 illustrate the general arrangement and association of parts in one of my preferred forms of multipolar single-phase alternating-current motors. H is the housing or outside framework; F, the field-magnet cores suitably laminated; A, the armature-core of ring type, drum-wound; $a$, the armature-windings which consist, in this instance, of conducting bars laid in grooves or channels in the face of the armature-core, and connected with the commutator plates or segments $c$ in the manner of constant-current drum-armatures. The exciting-coils of the field-magnet are shown at $f$, the terminal connections being indicated by $f'$. The brushes B may be of the type shown, or of any other preferred form. The short-circuiting sleeve S, controlled by the hand-lever L, will be hereinafter again referred to and more fully described. These portions of the device are omitted from Fig. 2 in order to show the other features more clearly. The form, design, and construction of the various parts being largely questions of choice, in view of the well-known laws, need no detailed description as they may be widely varied without departing from the principles of my invention.

Figs. 3 to 9 are diagrammatic illustrations of my invention. For simplicity, in Figs. 3 to 7, inclusive, I have shown my invention as embodied in bipolar machines. The diagrams for four-polar and mutipolar machines can, of course, be readily constructed from these diagrams, but as an illustration the bipolar form is, of course, less complex, and therefore more clearly sets forth the invention.

In Fig. 3 the armature A is represented as a Gramme-wound ring-armature, the coils being indicated by $a$. These are connected with the plates or segments $c$ of a collector or commutator, and brushes B, connected by means of suitable conductors $b$, are employed to supply the armature with alternating currents tending to produce poles at corresponding points in the armature. The field-core F is excited by the coils $f$, supplied with an alternating current through the terminals $f'$. In starting, as shown in the figure, the field-coils and the armature may be connected in series with a single source of current, or in shunt, or in any other way equivalent to the connections of a constant-current motor. The brushes will be adjusted in such manner as to produce the greatest torque, and the motor will consequently start under the most favorable conditions in the same manner as a constant-current machine, the sole difference being that the current is rapidly reversing, but for each impulse the effect is similar to that of a constant current, the armature-poles being approximately at right angles to the maximum field. A resistance R, either ohmic or inductive, may be employed to regulate the strength of the current. As the armature starts under a light load, or in merely overcoming its inertia, and approaches a speed of rotation corresponding with, or synchronous to, the current-reversals, a sleeve S, provided with contacts for the individual commutator-segments, is brought against the commutator, short-circuiting each of the armature-coils, and thereby permitting the free action of the local currents induced by the field, and causing the motor to operate in the usual manner for single-phase alternating currents with short-circuited armature. In this manner the motor is enabled to start and acquire speed under the same advantageous circumstances which are present in constant-current machines, yet, after speed is attained, it runs as a non-synchronous or lag alternating-current motor. After short-circuiting the armature-coils, the brushes may be raised from the commutator to save wear; care, of course, being taken to complete the circuit for the field-current before this is done. One very simple way of short-circuiting the armature-coils is illustrated in Fig. 1. The sliding sleeve S, turning with the shaft, carries the short-circuiting contacts $s$. The sleeve may be thrown against the end of the commutator or withdrawn by means of a hand-lever L, provided with a collar or pins running in a channel in the sleeve S. The contacts $s$, when forced under the ends of the commutator-segments, bear against the inner faces of each adjacent pair, and thereby directly connect them, closing the circuit of each section of armature-coil upon itself. This short-circuiting of the armature-windings may also be effected automatically, as illustrated in Fig. 10. In this instance, the sleeve S is actuated by the dogs or short arms $l$, which, by means of the spring $l'$, hold the sleeve withdrawn from the commutator. When, however, a predetermined speed is attained, the weights $w$ upon the other arms of these parts $l$ are thrown out by the centrifugal force, advancing the sleeve and its contacts firmly against the commutator, and thereby closing the short circuits.

Figure 4:
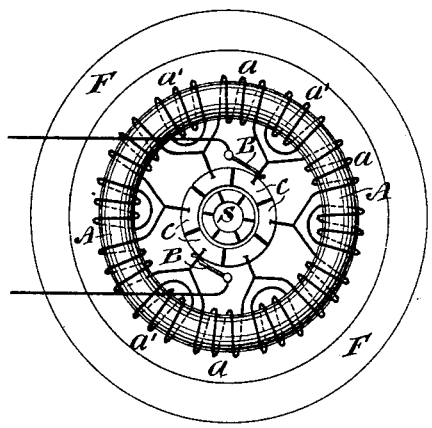

In Fig. 4 I show a modified form of the armature-winding in which permanently-closed coils $a'$ are employed upon the armature, in addition to the other or commutated coils already described. The two sets of windings may, of course, be arranged side by side upon the armature-core, or may be superimposed one upon the other in two or more layers. Generally, also, it is preferable to employ some resistance in the permanently short-circuited coils $a'$, because, at starting, these coils will otherwise be subjected to excessive induction, and consequently both waste the current and cause needless heating without producing any useful effect. I have, however, in the drawings shown them directly short-circuited as they may be so employed, and the manner in which they may be connected, either with a fixed resistance, or with a resistance controllable at will by the attendant, is too obvious to require explanation or illustration in the diagram. Such an armature, in which some of the coils are always more or less short-circuited, and the others connected through the commutator and brushes with the source of current, possesses the following capabilities of operation: The commutated coils should consume a comparatively small proportion of the energy of the motor, and for this reason may be made with only a few turns for each section. In starting the motor, therefore, either with no load, or with a very light load, these coils, acting as in constant-current machines, will produce torque and quickly give the armature its required speed. The short-circuited windings, acting in conjunction with the commutated coils, will by neutralizing self-induction entirely prevent sparking at the commutator even if the brushes are not adjusted at exactly the neutral plane. When the armature acquires a speed approximately synchronous to the current, two turning moments will be present. One moment is that due to the effect of the commutated coils which, as well understood, will be reduced, or even entirely checked, by the counter electromotive force, if the armature is connected in shunt to the field-coils, or if it is connected to a separate source of energy. The second moment is that due to the short-circuited or induced windings, and these, at approximately synchronous speed, will be the chief torque-producing coils. Such a motor is extremely sensitive to variations in speed, because at synchronism very little current will be induced, but as load is applied the lag of the armature causes rapidly-increasing currents in the induced windings, while at the same time allowing more current to flow in the commutated windings, owing to the decrease of counter electromotive force. Both moments, therefore, tend to keep the rotation approximately synchronous, but in starting the commutated coils produce the effective torque. A motor so constructed may also be operated in a manner similar to that described in connection with Fig. 3, that is to say, when speed has been attained, a sleeve S may be advanced as before to short-circuit the commutated windings, thereby converting the motor into a single-phase short-circuited alternate-current motor.

Figure 5:
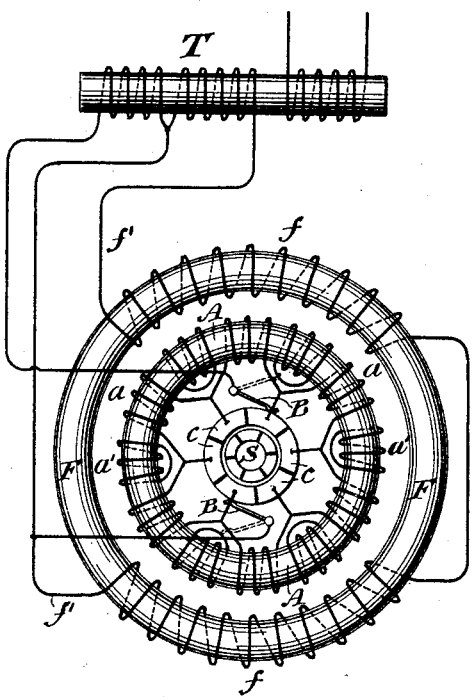

In Fig. 5 I have illustrated the connections for my motor as supplied from the secondary coils of a transformer T. At starting, therefore, the armature and the field are supplied from separate sources, but after synchronous speed has been reached the commutator-brushes are raised and the segments short-circuited as before. The armature-winding for such a motor may be similar to that shown either in Fig. 3 or Fig. 4.

Figure 6:
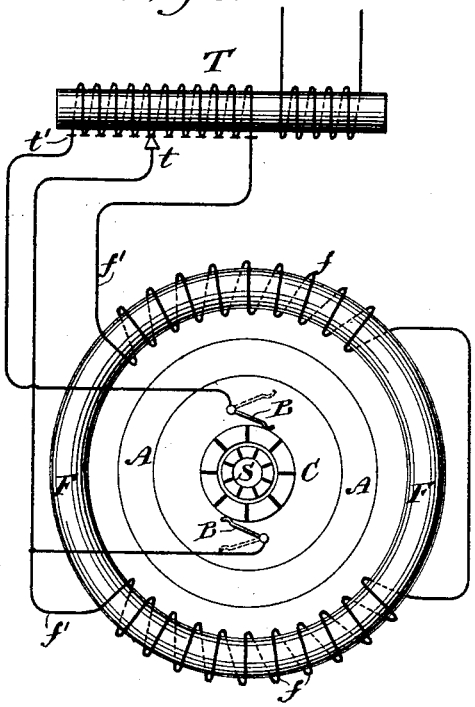

Fig. 6 shows a modification of Fig. 5 which is decidedly preferable, because it utilizes all the secondary coils of the transformer when the motor is running as a short-circuited motor. One of the commutator-brushes and one of the terminals $f'$ of the field-coils are connected in common to a sliding contact $t$, which connects successively with different sections of the secondary coil of the transformer, and may be adjusted to throw more or less of the secondary coils into the field-circuit. The other commutator-brush and the other field-terminal $f'$ are connected, respectively, to the extreme ends of the transformer-coils, so that after starting, as in Fig. 6, with part of the energy from the transformer supplied to the field-magnets and part to the armature, the contact $t$ may be shifted to gradually cut out the coils energizing the armature until, reaching the extreme contact $t'$, the armature-coils are short-circuited through the brushes and the whole series of transformer-coils then supply current to the field-coils $f$. The sleeve S may then be used as before to severally short-circuit the individual armature-coils, after which the brushes may be raised from the commutator.

Figure 7:
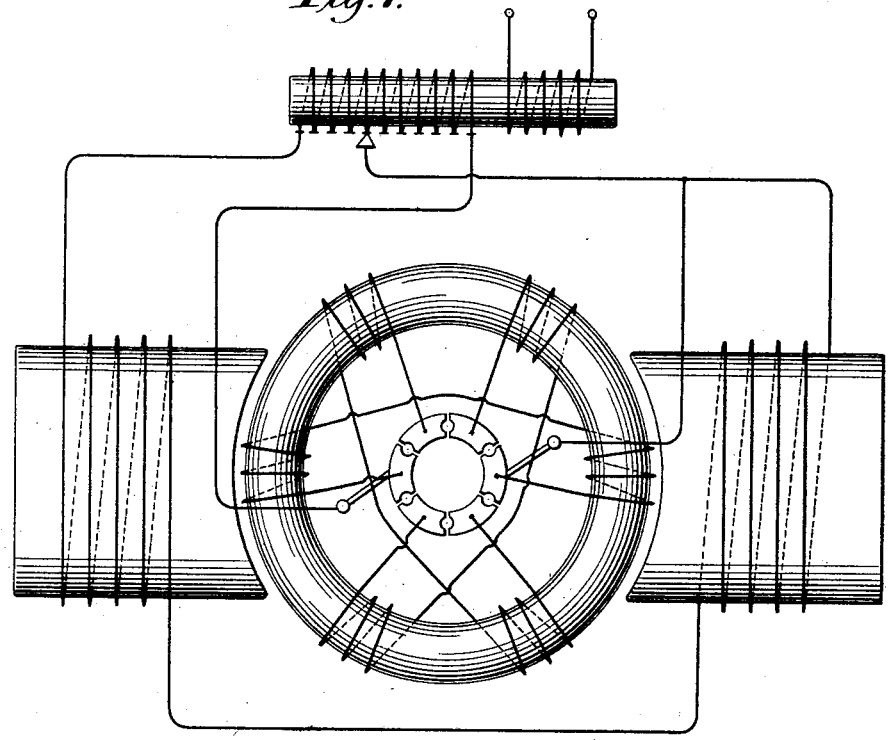

In Fig. 7 I illustrate connections similar to those shown in Fig. 6, and capable of operation in the same way, with the exception that the armature, instead of being of the Gramme type, is an open-coil ring-armature; and the connections for an open-coil drum-armature may, of course, be identical. The brushes should be placed in the neutral plane as before, but in this instance the neutral plane of the commutator is, of course, perpendicular to that of a Gramme ring. When synchronism is reached, the commutator-plates are short-circuited by introducing the plug-contacts between adjacent pairs of segments, though of course any other short-circuiting contacts may be substituted.

So far in the description of the diagrams I have indicated the connections for two-pole motors, because these may be modified, in ways with which every electrician is familiar, to adapt them to any number of poles. In order not to require too high a speed, alternate-current motors of the multipolar type will always be preferred, because of the lower speed corresponding to synchronism. This required speed is, of course, equal to the number of current-reversals per second divided by the number of poles, or the number of complete phases per minute divided by the number of polar couples or pairs.

For multipolar motors I have designed a special armature and short-circuiting device which, for a four-pole motor, is indicated in Fig. 8. The armature-coils are connected in groups between each commutator connection, and the groups are connected in series, so that in following around the windings, the current, in leaving the commutator-plate, passes under two poles and then back to a commutator-plate at an angle with the first commutator-plate approximately equal to the angle between the polar centers. In the drawings I have shown twenty-six coils divided into thirteen pairs, and connected with thirteen commutator-plates. I have lettered these pairs successively from 1 to 13, inclusive, so that they may be readily traced out in the diagram. I have lettered some of the commutator-plates 1 2 3, &c., to correspond. From this diagram it will be clear that if at least one-half the plates are directly short-circuited by the contact S all the armature-coils will be short-circuited in groups of four. Where thirteen commutator-plates are employed, seven plates must be connected together. When any other number of commutator-plates are used, it will be sufficient to have the short-circuiting device contact with $\frac{n+1}{p}$ where $n$ is the number of commutator-bars, and $p$ the number of couples. Graphically expressed this rule merely means that a portion of the commutator corresponding angularly with the distance between the centers of like poles must be short-circuited in order to short-circuit all the coils in series groups, as described.

In Fig. 9 an arrangement of the armature for a six-pole polyphase motor is shown. The armature has three or more sets of commutated coils $a$ of the open-coil ring type, and short-circuited coils $a'$ in sets corresponding with the number of pole-pieces. Of course any number of coils may be employed. In the diagram I have shown these short-circuited coils connected in pairs from opposite sides of the armature, because each such pair of coils will always receive substantially the same amount of induction, and may therefore be connected as well in series as individually short-circuited. If connected in series, a slight regulating or balancing effect is produced as the coils at opposite sides of the armature are then necessarily of equal effect. The other coils $a$ are connected with the commutator-segments $c$, and three brushes B are employed corresponding with the three phases of the field-circuit. Such a motor may be operated in two ways, both analogous to single-phase motors. In one instance the brushes may be connected with the external circuits, so that in starting the maximum field and the maximum armature currents correspond to produce a torque in a manner similar to a section of a straight-current machine. There will then be a continuous torque upon the armature, but the location of the maximum current in the armature will of course revolve with the changes of phase. When approximate synchronism has been attained, the brushes may be short-circuited to close the field-magnet circuits, and then the commutator-plates may be short-circuited by a sleeve such as has already been described. With this operation of the motor a minimum current is consumed. The efficiency may be still further increased by the introduction of suitable resistances in the short-circuited coils $a'$, or the motor may be constructed without any permanently short-circuited coils, and operated analogously to the form shown in Fig. 1, the sole difference being that it is actuated by triphase or polyphase currents instead of a single-phase current. The second way of starting and controlling such a motor is by connecting the brushes together, and allowing the induced currents to produce successive poles at points determined by the position of the brushes. When synchronism is reached, the short-circuiting device may be employed to locally close the several coils. This manner of operating is very efficacious, but I prefer the one first described.

The raising of the brushes from the commutators of all forms of my machines may, of course, be effected at the same time, or directly after, the short-circuiting, by means of mechanical connections between the apparatus which closes the short circuit and the device employed to raise the brushes. Such mechanical connection is, of course, extremely simple and may be arranged in very many ways. Therefore I have only shown the brushes and the short-circuiting apparatus as separately operated, either by hand or automatically, leaving further mechanical details, as I have left all the more general electrical details, to be introduced in such form as may seem best to the practical needs for which each motor is designed.

The design and construction of a motor, in accordance with well-known established rules, is subject to so much variation that it would be useless and objectionable in this specification to set forth the form, construction, and operation of each of the well-known elements and parts. The obvious modifications for drum, ring, disk, and Pacinotti armatures would be foreign to the purposes of this description. The advantages of having rotary field-magnets and stationary armatures will also be clear to those familiar with the art, and the somewhat simpler means by which the resistances may be introduced and the short circuits made and broken in the case of a stationary armature will, of course, be apparent. I have, however, in the foregoing description, fully set forth and illustrated one manner of carrying out each modification of my method with which I am familiar, and have shown and described the preferred forms of my apparatus in so far as the details are part of my invention. I have purposely omitted the enumeration of the many slight modifications and variations both of the methods and of the apparatus which may readily be made without departing from the principles of my invention, because to set these forth at length would obscure rather than make clear the more essential features.

Having, however, explained the latter, I claim, and desire to secure by these Letters Patent, together with all such modifications and variations as may be made by mere skill in the art, and with only the limitations and restrictions expressed or necessarily implied, the following:

1. The method of operating motors for alternating and similar currents—by connecting the field-coils and some of the armature-coils, with a source or sources of alternating or similar currents, and establishing induced currents in locally-closed armature-coils, whereby two distinct moments may be produced varying with, and regulated by, the speed of the motor, substantially as and for the purposes set forth.

2. The method of operating motors for alternating and similar currents—by connecting the field-coils and some of the armature-coils with a source or sources of alternating or similar current, while starting, and establishing induced currents in locally-closed armature-coils, and thereafter when sufficient speed is attained short-circuiting all of the armature-coils, substantially as and for the purposes set forth.

3. The method of operating motors for alternating and similar currents—by connecting the field and armature coils with a source or sources of alternating or similar current, while starting, and thereafter individually short-circuiting the armature-coils and completing the field-circuit independently of the armature, substantially as and for the purposes set forth.

4. The method of operating motors for alternating and similar currents—by connecting the field-coils and armature-coils with a source or sources of alternating current and thereafter increasing the electromotive force or current strength acting upon the field-coils or decreasing that acting upon the armature-coils, and when sufficient speed has been attained short-circuiting the armature-coils, substantially as and for the purposes set forth.

5. In combination in a motor for alternating or similar currents, field-windings, armature-coils, commutator, and commutator-brushes, connected in series or shunt as customary in constant-current motors, and short-circuited induced armature-coils, substantially as and for the purposes set forth.

6. In combination in a motor for alternating or similar currents, field-windings, armature-coils, commutator, and commutator-brushes, connected in series or shunt as customary in constant-current motors, short-circuited induced armature-coils, and means for short-circuiting the first said armature-coils, substantially as and for the purposes set forth.

7. In combination in a motor for alternating or similar currents, field-windings, armature-coils, commutator, and commutator-brushes, connected as in constant-current motors, and means for individually and locally short-circuiting the first said armature-coils, substantially as and for the purposes set forth.

8. In combination in a motor for alternating or similar currents, field-coils, armature-coils, a commutator and brushes therefor, a transformer, and connections including the said field-coils in circuit with some of the secondary coils of the said transformer and the said brushes and armature-coils with the other of the secondary coils, and means for short-circuiting the said armature-coils and cutting them out of circuit with the said secondary coils of the transformer, substantially as and for the purposes set forth.

9. In combination in a motor for alternating or similar currents, field-coils, armature-coils, a commutator and brushes therefor, a source or sources of alternating or similar current, connections therefrom to the said field-coils and the said armature-coils, means for varying at will the current or currents supplied, and means for short-circuiting the said armature-coils, substantially as and for the purposes set forth.

10. In combination in a multipolar motor for alternating or similar currents, armature-coils connected in series groups, a commutator therefor, and a short-circuiting device formed to short-circuit a number of commutator-plates approximately equal to or greater than the total divided by the number of polar couples, substantially as and for the purposes set forth.

11. In combination in a motor for alternating or similar currents, an armature, armature-coils, and commutator therefor, a conducting-sleeve or other device mounted adjacent to the said commutator and means for bringing the said device into contact with the plates or segments of the said commutator to individually short-circuit the said armature-coils, substantially as and for the purposes set forth.

12. In combination in a motor for alternating or similar currents, an armature, armature-coils, and commutator therefor, a conducting-sleeve or other device mounted adjacent to the said commutator, and centrifugal or other automatic means for bringing the said device into contact with the plates or segments of the said commutator at a certain speed to individually short-circuit the said armature-coils, substantially as and for the purposes set forth.

13. A non-synchronous alternating-current motor having its induced winding provided with a collector and corresponding brushes, connected and adjusted to produce poles in the induced winding, the position and action of which poles produce a turning moment and start the motor, and means for producing the short-circuiting of the induced winding, after the motor has attained its normal speed, substantially as set forth.

In testimony whereof I have hereunto set my hand this 23d day of May, 1894.

ENGELBERT ARNOLD.

In presence of—
   HELENE ARNOLD,
   H. LABHART.